United States Patent
Horton et al.

(10) Patent No.: US 6,776,038 B1
(45) Date of Patent: Aug. 17, 2004

(54) SELF-GENERATING DIFFERENTIAL PRESSURE MEASUREMENT FOR LIQUID NITROGEN AND OTHER LIQUIDS

(76) Inventors: Kevin Eldon Horton, Pacer Digital Systems, Inc., 8658 Castle Park Dr., Indianapolis, IN (US) 46256; J. Warren Oeff, Pacer Digital Systems, Inc., 8658 Castle Park Dr., Indianapolis, IN (US) 46256

( * ) Notice: Subject to any disclaimer, the term of this patent is extended or adjusted under 35 U.S.C. 154(b) by 0 days.

(21) Appl. No.: 10/405,864

(22) Filed: Apr. 2, 2003

Related U.S. Application Data (60) Provisional application No. 60/372,753, filed on Apr. 16, 2002.

(51) Int. Cl.[7] .............................................. G01F 23/00
(52) U.S. Cl. ..................................... 73/299; 73/290 R
(58) Field of Search ............................... 73/299, 290 R, 73/292, 295

(56) References Cited

U.S. PATENT DOCUMENTS

| | | | |
|---|---|---|---|
| 4,020,690 A | * | 5/1977 | Samuels et al. .............. 73/299 |
| 4,135,548 A | | 1/1979 | Sears |
| 5,018,387 A | * | 5/1991 | Myneni ....................... 73/295 |
| 5,060,481 A | | 10/1991 | Bartlett et al. |
| 5,275,007 A | | 1/1994 | Neeser |
| 5,419,143 A | | 5/1995 | Leonard et al. |
| 5,582,218 A | | 12/1996 | Beale |
| 5,790,422 A | | 8/1998 | Power et al. |

\* cited by examiner

*Primary Examiner*—Herzon Williams
*Assistant Examiner*—Rodney Frank
(74) *Attorney, Agent, or Firm*—C. John Brannon; Bingham McHale LLP (57) ABSTRACT

The depth of a cryogenic liquid in a Dewar may be ascertained by inserting a measurement probe into the container. The measurement probe includes a hollow tube having a proximal end and an open distal end, a heater operationally connected within the tube and positioned substantially adjacent the distal end, a pressure sensor operationally connected within the tube and positioned substantially adjacent the proximal end, and a microcontroller in electric communication with the heater and with the pressure sensor. The distal end of the measurement probe is placed against the bottom of the container, liquid from the container enters the tube, and is evaporated by the heater. The gas pressure in the tube between the heater and the pressure sensor is increased, until the gas pressure in the tube is equal to the pressure exerted by the liquid in the Dewar. A quasi-equilibrium condition (dependent upon continued heat supplied from the heater) is achieved between the gas pressure in the tube and the pressure from the liquid in the Dewar. A voltage output signal is generated from the pressure sensor proportional to the gas pressure in the tube and is correlated with a liquid depth value. The liquid depth value is then output.

18 Claims, 7 Drawing Sheets

SELF-GENERATING DIFFERENTIAL PRESSURE MEASUREMENT FOR LIQUID NITROGEN AND OTHER LIQUIDS

REFERENCE TO RELATED APPLICATION

This application claims priority to U.S. Provisional Patent Application Serial No. 60/372,753 filed Apr. 16, 2002.

TECHNICAL FIELD OF THE INVENTION

The present invention relates generally to liquid measurement, and more particularly to a method and apparatus for ascertaining the depth of cryogenic liquid in a container.

BACKGROUND OF THE INVENTION

Cryogenic temperatures are necessary for such processes as the long-term storage of biological materials and the generation of superconductivity. Cryogenic temperatures are sustained through the use of cryogenic liquids, such as liquid nitrogen, that have very low boiling temperatures. Such cryogenic liquids are typically circulated from a storage container to provide cryogenic cooling for a desired application. Accordingly, it is important to be able to accurately gauge the amount of cryogenic liquid remaining in a storage container.

The cryogenic nature of the cryogenic liquid, that very property which makes the cryogenic liquid valuable, also makes the measurement of the amount of cryogenic liquid in a container difficult. The extremely low temperatures of the cryogenic liquids are hostile to measurement techniques that involve mechanical measurements transmitted through motion linkages. This is in part due to the different mechanical and physical properties exhibited by sensor materials when exposed to cryogenic temperatures, such as extreme thermal expansion differentials, excessive brittleness, increased stiffness, and the like. Likewise, while some electronic techniques are better suited for cryogenic liquid measurement, electronic measurement techniques tend to either require bulky and/or expensive equipment or must be permanently installed in the container.

Therefore, there remains a need for a quick, simple and portable technique for measuring the amount of cryogenic liquid in a container. The present invention addresses this need.

SUMMARY OF THE INVENTION

The present invention relates to a method and apparatus for measuring the depth of a cryogenic liquid in a container. The apparatus includes a tube having a proximal opening, a distal opening and a generally cylindrical body extending therebetween defining the border between a tube interior and a tube exterior, a resistance heater positioned within the tube substantially adjacent the distal end, a microcontroller in electrical communication with the resistor, and a pressure sensor connected in pneumatic communication with the proximal opening of the tube. The pressure sensor forms a pneumatic seal with the tube. The microcontroller is adapted to selectively actuate the resistance heater to evaporatively remove liquid from the tube, increasing the gas pressure therein and on the pressure sensor. Fluidic communication between the tube interior and the tube exterior is restricted to the distal opening. The microprocessor receives a voltage signal from the pressure sensor in proportion to the gas pressure in the tube and in turn calculates the depth of liquid displaced from the tube.

One object of the present invention is to provide an improved method and apparatus for measuring the depth of liquid in a container. Related objects and advantages of the present invention will be apparent from the following description.

DESCRIPTION OF THE PREFERRED EMBODIMENTS

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

FIGS. 1, 2A, 3, 4A and 5A–C relate to a first embodiment of the present invention, an apparatus 10 for measuring the level or amount of liquid 15 remaining in a container 17. In the preferred embodiment, it is envisioned that the liquid 15 is a cryogenic liquid, such as liquid nitrogen, and the container 17 is a Dewar or the like, i.e. the container 17 is preferably adapted to hold a cryogenic liquid. However, the apparatus 10 may be readily adapted to work with any liquid 15 medium held in any container 17.

Figure 1:
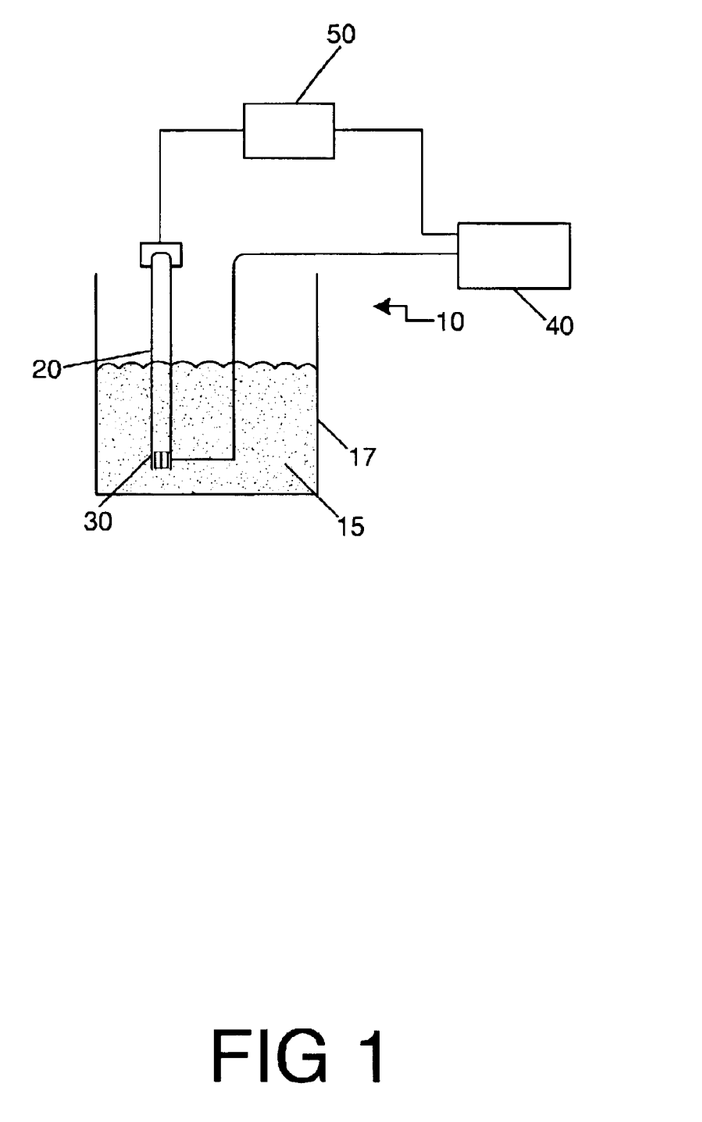
FIG. 1 is a schematic diagram of a first embodiment of the present invention, an apparatus for measuring the depth of liquid in a container having a measurement probe for insertion into a liquid-filled container.

FIG. 1 is a schematic illustration of the apparatus 10 emplaced in a container 17 partially filled with liquid 15. The apparatus includes a measurement probe or sleeve 20, which is essentially a hollow tube connected to a heater 30. The heater 30 is preferably at least partially enclosed within the probe 20, but may alternately be connected in any convenient manner that allows thermal communication with the interior of the probe 20. The heater 30 is electrically connected to a power source 40, which is preferably a microcontroller. The measurement probe 20 is also connected in pneumatic communication with a pressure sensor 50. The pressure sensor 50 is preferably connected to the microcontroller 40.

Figure 2A:
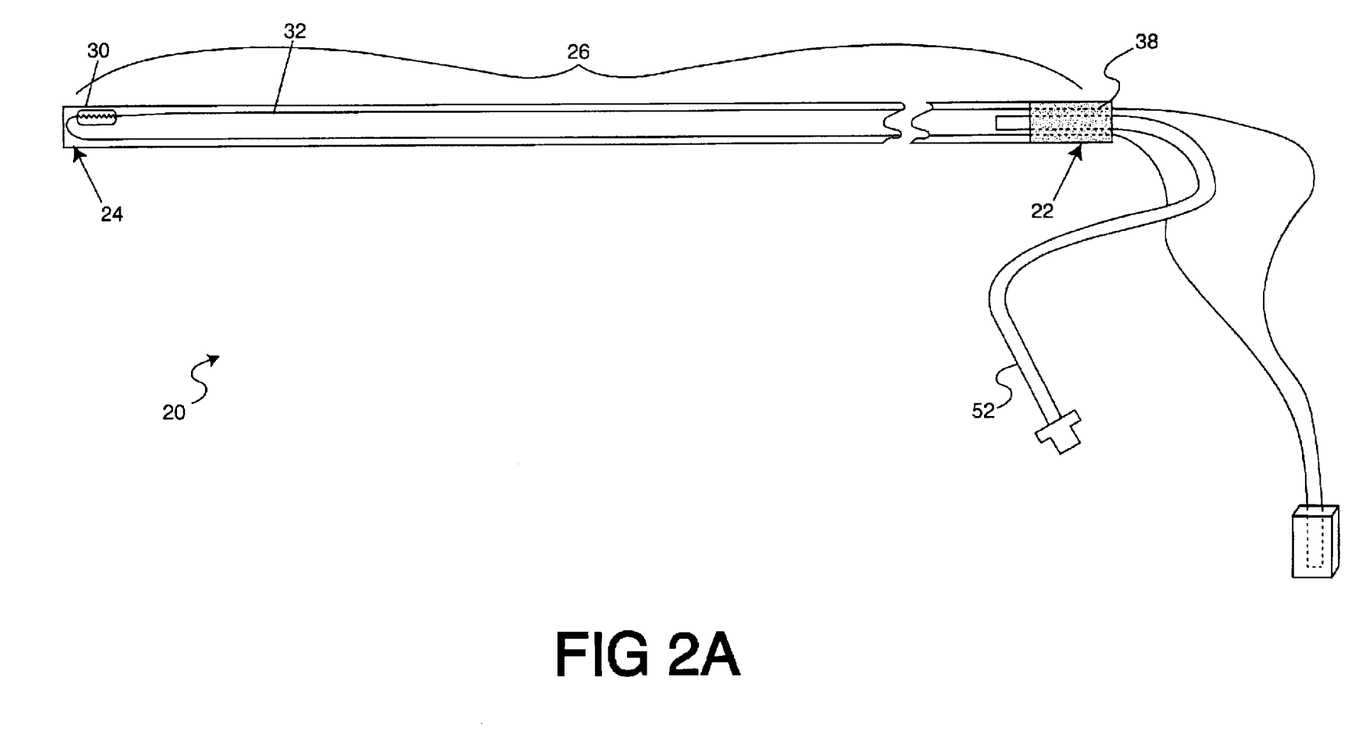
FIG. 2A is an enlarged partial side elevational view of the probe of FIG. 1.

FIG. 2A illustrates the measurement probe 20 in greater detail. The measurement probe 20 includes a proximal end 22 and a distal end 24 with a generally cylindrical nonporous portion extending therebetween and defining a hollow tube 26. A heater 30 is emplaced in the hollow tube 26, and is preferably positioned substantially adjacent the distal end (although the heater 30 may be positioned within the tube 26 spaced from the distal end 24, so long as the distance from the heater 30 to the distal end 24 is substantially invariant and known. The heater 30 is connected to a power source 40 by one or more electrical conduits 32.

Figure 2B:
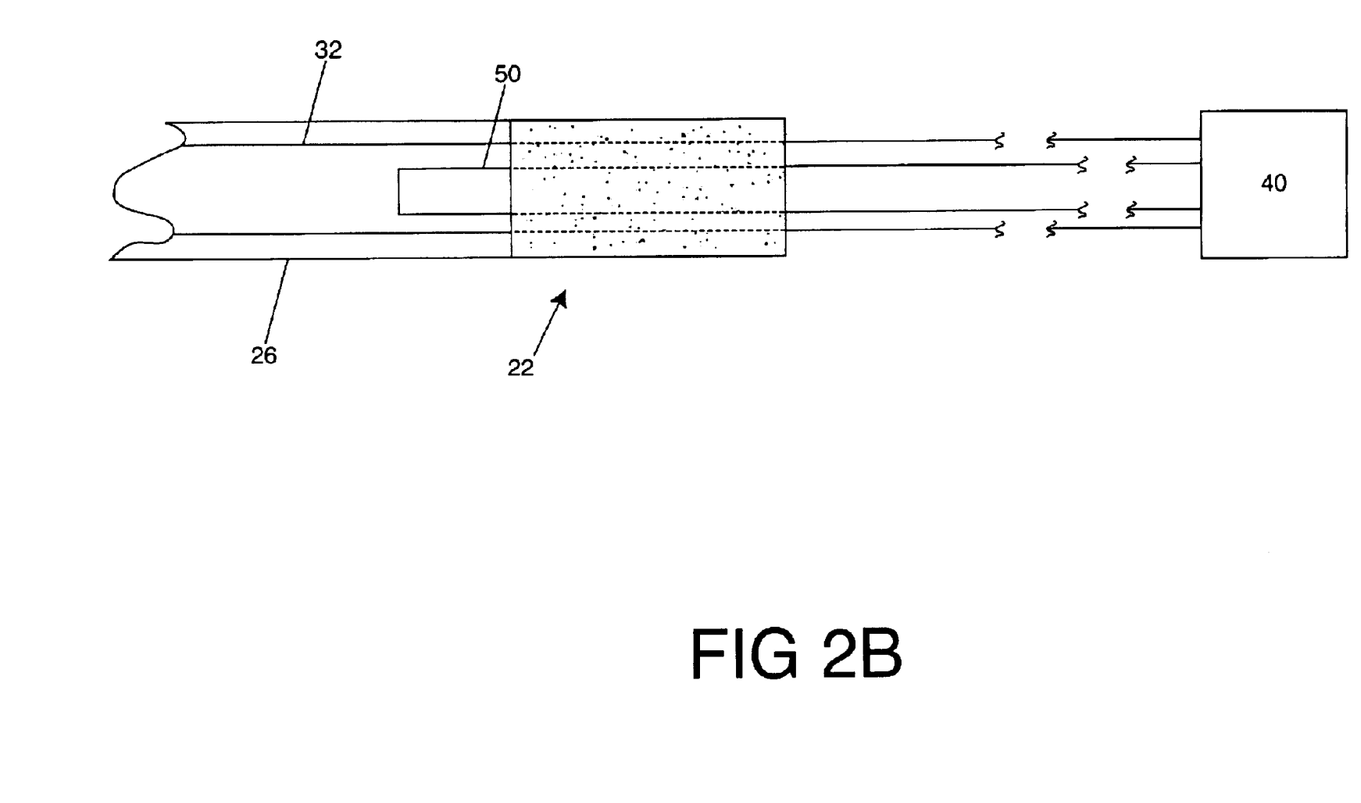
FIG. 2B is an enlarged partial side elevational view of an alternate embodiment probe of FIG. 1.

The proximal end 22 of the measurement probe 20 is substantially sealed regarding fluid flow therethrough, such as by a plug 38. A pressure sensor 50 is positioned in pneumatic communication with the interior of the tube 26 (see FIGS. 1 and 3.) The pressure sensor 50 and electrical conduits 32 extend through the plug or seal 38. Preferably, the pressure sensor 50 is a transducer, such as a piezoelectric device, that directly transduces mechanical energy into electrical energy. Alternately, the pressure sensor 50 may be of any convenient design. Preferably, the pressure sensor 50 is pneumatically connected to the proximal end 22 by a pressure conduit 52, such as a hose or tube through which the measurement probe 20 pneumatically communicates with the pressure sensor 50. The pressure sensor 50 is also connected in electric communication to the microcontroller 40. Alternately, a piezoelectric transducer device 50 may be positioned within the measurement probe 20 and electrically connected through the plug 38 to the microcontroller 40 (see FIG. 2B.)

Figure 3:
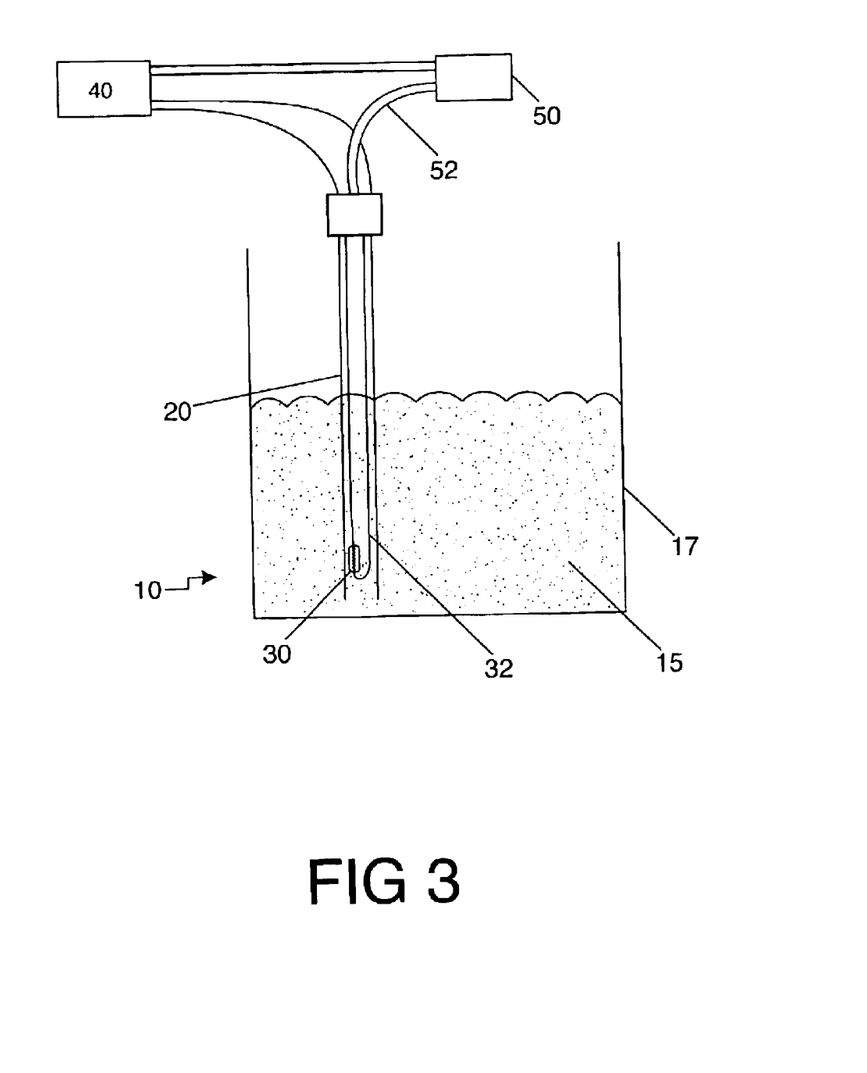
FIG. 3 is a side cutaway view of FIG. 1.
Figure 4A:
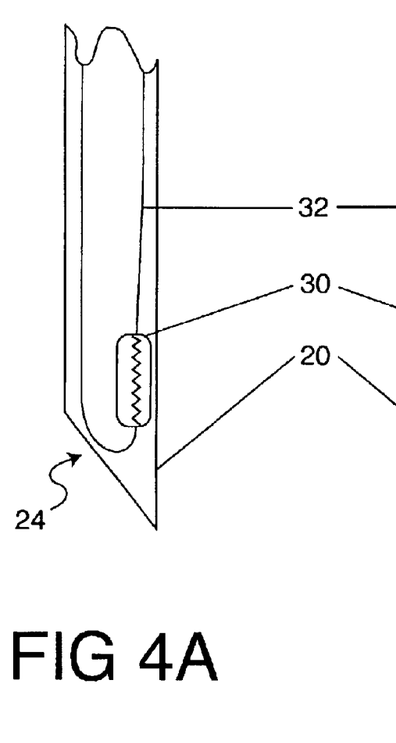
FIG. 4A is an enlarged partial cutaway view of the probe of FIG. 3.
Figure 4B:
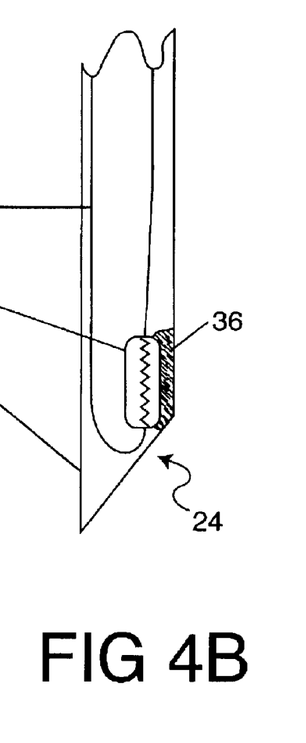
FIG. 4B is an enlarged partial cutaway view of an alternate embodiment probe of FIG. 3.

FIG. 3 describes the positioning of the apparatus 10 in a container 17 partially filled with a liquid 15 to be measured. The measurement probe 20 is preferably inserted into the container 17 such that it extends substantially to the bottom thereof. The measurement probe 20 is also preferably oriented such that liquid may freely flow thereinto through the open distal end 24. The distal end 24 preferably includes one or more apertures formed therethrough to allow fluidic communication therethrough.

The heater 30 is positioned such that it is substantially adjacent to the distal end 24 of the probe 20. Preferably, the heater 30 is positioned such that, when the probe 20 is emplaced into the container 17, the heater 30 is positioned as close to the bottom of the container as possible and is held in place by the stiffness of connecting wire 32 (see also FIG. 4A.) This is desirable since the liquid level below the heater 30 is not directly measured by the apparatus 10. Alternately, the heater 30 may be spaced away from the distal end 24, so long as the distance from the distal end 24 to the heater 30 is fixed and known. In another alternate embodiment, the heater 30 is affixed in place within the distal end 24 by an adhesive 36.

The pressure sensor 50 is connected in fluidic communication with the proximal end of the probe 20, preferably forming a fluid-tight seal with the probe 20. More preferably, a pressure conduit 52 fluidically connects the probe 20 to the pressure sensor 50 to allow for flexibility of use of the apparatus 10. Both the pressure sensor 50 and the heater 30 are connected in electric communication with the microcontroller 40. Preferably, the pressure sensor 50 provides an analog voltage output signal to the microcontroller in proportion to the measured pressure.

Figure 5A:
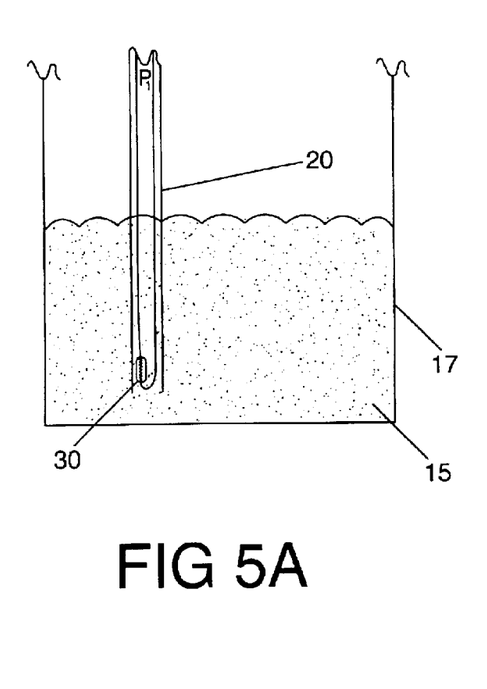
FIG. 5A is an enlarged partial cutaway view of FIG. 3 with the heater off.
Figure 5B:
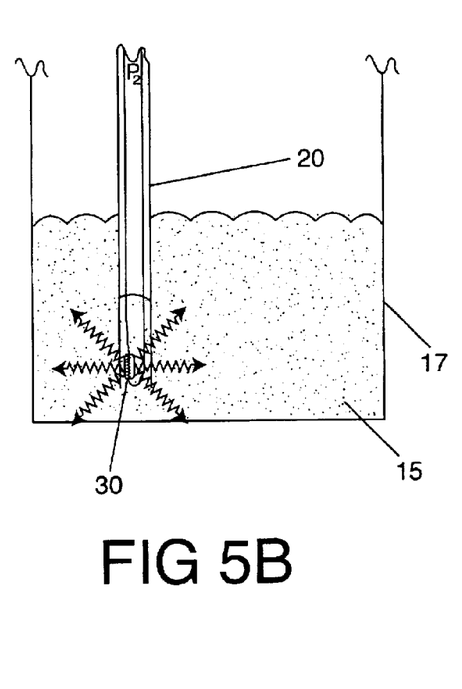
FIG. 5B is an enlarged partial cutaway view of FIG. 3 with the heater actuated to evaporate the liquid in the probe.
Figure 5C:
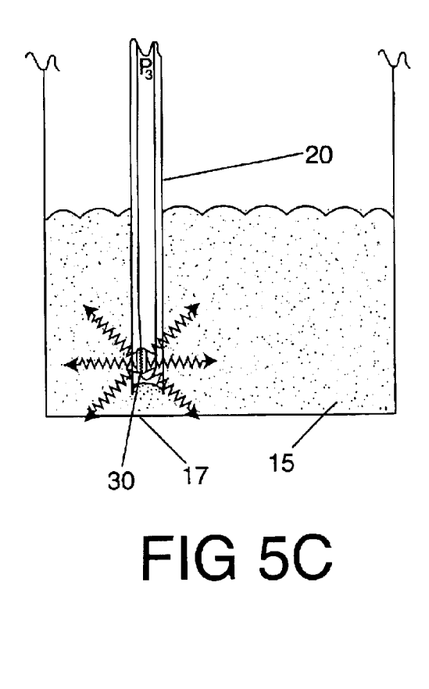
FIG. 5C is an enlarged partial cutaway view of FIG. 3 with substantially all of the liquid in the probe evaporated or pushed out.

In operation, as illustrated in FIGS. 5A–C and 6, the apparatus 10 is immersed in a container 17 at least partially filled with a fluid 15, such that the proximal end 24 of the probe 20 is substantially adjacent the bottom of the container 17. This orientation of the probe 20 likewise positions the heater 30 at the optimum (maximum) liquid depth (FIG. 5A.) Upon immersion, liquid 15 enters the probe 20 through the distal end 24 and rises to a level substantially equal to that of the liquid in the surrounding container. The heater 30 is then actuated to generate sufficient heat 60 to begin evaporating the liquid 15 now present in the interior of the probe 20 (FIG. 5B.) Preferably, sufficient heat 60 is generated to quickly boil the liquid 15 occupying the interior volume of the probe 20, although the liquid 15 in the probe 20 may be more slowly evaporated as desired. The gas 62 generated by the evaporating liquid 15 rises to fill the interior volume of the probe 20 and urges liquid 15 out of the probe 20 as the pressure of the gas 64 within the probe 20 increases. In other words, the gas 62 generated by the boiling liquid 15 fills the probe volume 64 between the heater 30 and the plug 38, displacing liquid 15 from within the confines of the probe 20 interior until an equilibrium is achieved wherein the liquid level within the probe 20 is such that liquid 15 is present only between the heater 30 and the proximal end 24, if at all (FIG. 5C.)

When equilibrium is achieved, the gas pressure within the probe 20 is equal to the pressure of the displaced liquid 15. Thus, if the density of the measured liquid 15 is known, the height of the displaced liquid column, and thus the depth of the liquid 15 in the container, may be calculated. The basic relation governing this calculation is:

$$P=(p \times z)/g$$

where P is the equilibrium pressure of the gas within the probe 20, p is the density of the displaced liquid 15, z is the original height of the column of displaced fluid 15, and g is the gravitational constant. It must be noted that P as measured includes the contribution of atmospheric pressure; this may accounted for by calibrating the apparatus before immersion to attain a baseline pressure set point corresponding to z=0; the corresponding voltage signal from the pressure sensor 50 is stored and subtracted from subsequent measurements.

Preferably, the microcontroller is pre-programmed with the gravitational constant and a routine to calculate z from the pressure data input from the pressure sensor 50. The density of the liquid 15 may be directly input into the microcontroller 40 for each measurement, may be selected from a pre-programmed table of densities of various liquids, or may be pre-programmed as a constant if the apparatus is always used to measure the same liquid medium.

Alternately, the microcontroller 40 may be programmed to linearly extrapolate z. This may be done by establishing two preprogrammed set points, such as the pressure sensor voltage output ($V_0$) corresponding to the z=0 baseline measurement and a second pressure sensor voltage output set point ($V_z$) corresponding to the immersion of the probe 20 into a known depth $z_1$ of liquid 15 (such as measured by a yardstick or the like.) A scale factor (SF) is then determined by the following relation:

$$SF=z_1/(V_2-V_0)$$

Once calculated, SF is stored in nonvolatile memory for use in calculating z during normal operation of the apparatus according to the function $$z=SF(V_x-V_0)$$

wherein $V_x$ is the instant voltage signal from the pressure sensor 50.

Figure 6:
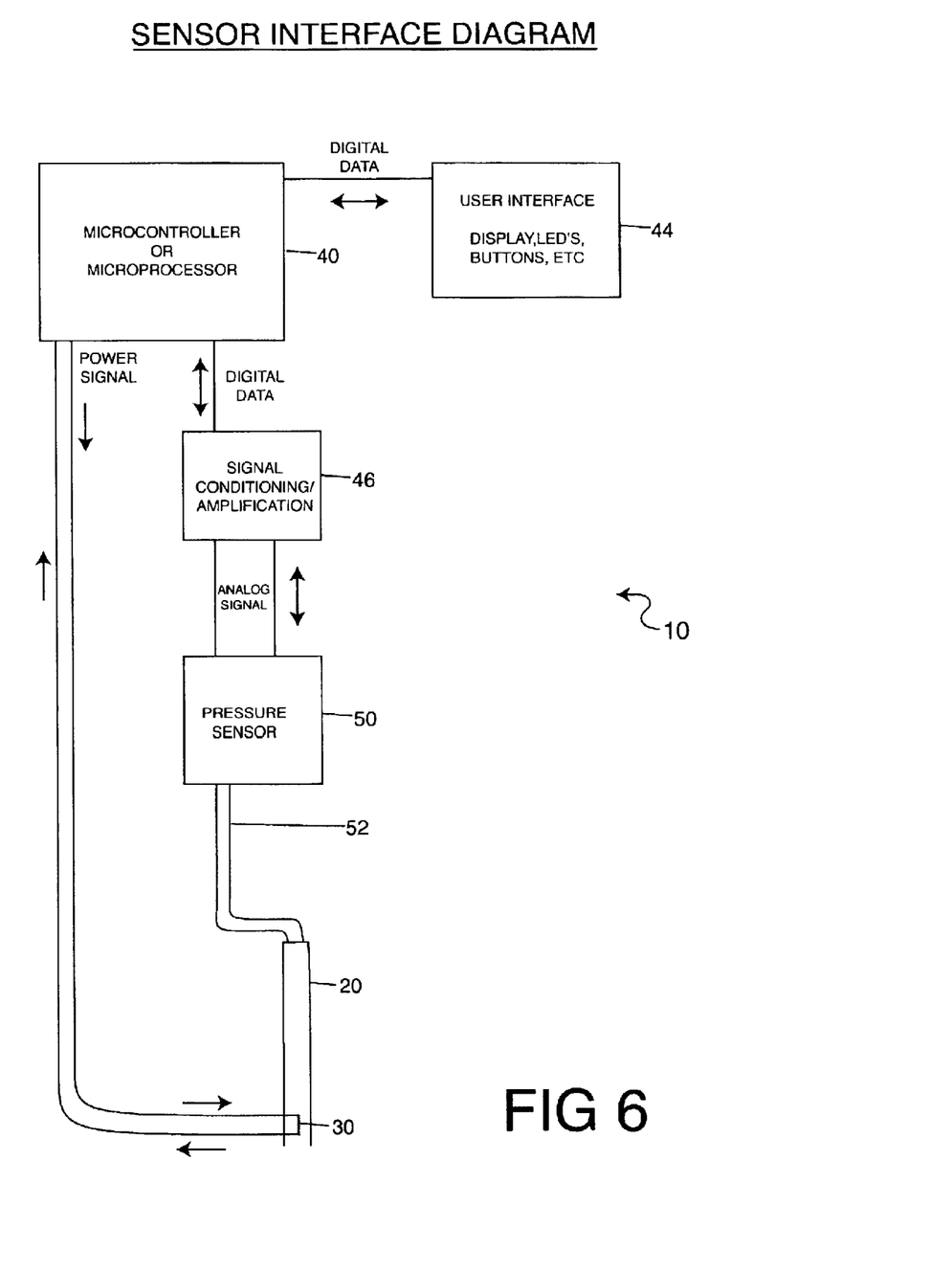
FIG. 6 is a block diagram of the functional relationships of the components of the FIG. 1.

In one preferred embodiment, the microcontroller 40 includes a user interface 44 through which commands and information may be input into the microcontroller 40 and through which the microcontroller may output or display information, including the calculated liquid level. Alternately, the user interface 44 may be separate from the microcontroller 40 and be operationally connected to the microcontroller in electric communication. Likewise, the microcontroller 40 may include functionality 46 for conditioning and/or amplifying signals received from the pressure sensor 50, such as a signal conditioning/amplification module 46 connected in electric communication between the pressure sensor 50 and the microcontroller 40.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A system for measuring the depth of a liquid in a container, comprising in combination:
   a single walled tube having a proximal opening, a distal opening and a generally cylindrical body extending therebetween defining the border between a tube interior and a tube exterior;
   a resistance heater positioned within the tube substantially adjacent the distal end;
   a microcontroller in electrical communication with the resistor;
   a pressure sensor connected in pneumatic communication with the proximal opening of the tube;
   wherein the pressure sensor forms a pneumatic seal with the tube;
   wherein the microcontroller is adapted to selectively actuate the resistance heater;
   wherein actuation of the resistance heater evaporatively removes liquid from the tube; and
   wherein fluidic communication between the tube interior and the tube exterior is restricted to the distal opening.

2. The system of claim 1 wherein the pressure sensor produces a voltage output signal having a signal strength proportional to the pressure experienced by the pressure sensor.

3. The system of claim 2 wherein the pressure sensor further comprises a piezoelectric material.

4. The system of claim 2 wherein the microcontroller is programmed to calculate a liquid depth when supplied with a voltage output signal from the pressure sensor.

5. The system of claim 1 wherein when actuated, the heater supplies a substantially constant heat output.

6. A sensor device, comprising in combination:
   a heater;
   a sleeve at least partially enclosing the heater;
   a microcontroller in electric communication with the heater;
   a transducer in electric communication with the microcontroller and positioned in pneumatic communication with the sleeve;
   wherein the microcontroller is adapted to receive signals from the transducer;
   wherein the microcontroller is adapted to actuate current to flow through the heater;
   wherein the sleeve defines an enclosure with a single opening through which fluids may substantially flow; and
   wherein the heater is positioned substantially adjacent the single opening.

7. The sensor device of claim 6 wherein the sleeve further comprises an enclosure having a proximal end and a distal end; wherein the distal end is open to fluidic flow therethrough; wherein the proximal end further includes the transducer; and wherein the proximal end is substantially closed to fluidic flow.

8. The sensor device of claim 6 wherein the transducer generates an output voltage signal that varies linearly as a function of pressure applied to the transducer.

9. The sensor device of claim 8 transducer is adapted to communicate the output voltage signal to the microcontroller and wherein the microcontroller is preprogrammed to use the output voltage signal to calculate the depth of a liquid.

10. The sensor device of claims 9 wherein the microprocessor is adapted to receive data regarding the liquid density and wherein the microcontroller is preprogrammed to use the data regarding the liquid density to calculate the depth of a liquid.

11. The sensor device of claim 6 wherein the heater is an electrical resistance heater.

12. A method for measuring the level of liquid in a container, comprising the steps of:
    a) inserting measurement probe into the container, the measurement probe further comprising:
    a hollow tube having a proximal end and an open distal end;
    a heater operationally connected within the tube and positioned substantially adjacent the distal end;
    a pressure sensor operationally connected within the tube and positioned substantially adjacent the proximal end; and
    a microcontroller in electric communication with the heater and with the pressure sensor;
    b) resting the distal end of the measurement probe against the bottom of the container;
    c) boiling the liquid in the tube to remove substantially all of the liquid between the heater and the pressure sensor;
    d) measuring the gas pressure in the tube; and
    e) calculating the depth of liquid in the container.

13. The method of claim 12 wherein the pressure sensor generates an output voltage signal that varies linearly as a function of pressure applied to the pressure sensor.

14. The method of claim 13 wherein step d further comprises measuring the output voltage signal.

15. The method of claim 13 wherein the microcontroller is preprogrammed with a first voltage signal value associated with zero liquid depth and with a second voltage signal value associated with a nonzero liquid depth; and wherein a step e) further comprises using the first voltage signal value associated with zero liquid depth and the second voltage signal value associated with a nonzero liquid depth to linearly extrapolate a liquid depth output value from the output voltage signal.

16. A method for ascertaining the depth of a cryogenic liquid in a Dewar, comprising the steps of:
    a) inserting a measurement probe into the container, the measurement probe further comprising:
    a hollow tube having a proximal end and an open distal end;
    a heater operationally connected within the tube and positioned substantially adjacent the distal end;
    a pressure sensor operationally connected within the tube and positioned substantially adjacent the proximal end; and
    a microcontroller in electric communication with the heater and with the pressure sensor;
    b) resting the distal end of the measurement probe against the bottom of the container;
    c) evaporating a portion of the liquid in the tube between the heater and the pressure sensor;
    d) increasing the gas pressure in the tube between the heater and the pressure sensor to increase the pressure on the pressure sensor and urge liquid out of the tube leaving a residual amount of liquid in the tube;
    e) achieving a quasi-equilibrium condition between the gas pressure in the tube and the residual amount of liquid in the tube;

f) generating a voltage output signal from the pressure sensor proportional to the gas pressure in the tube;

g) correlating the voltage output signal with a liquid depth value; and h) outputting the liquid depth value;

wherein liquid enters the tube as it is inserted into the container.

17. The method of claim 16 wherein step g) is a linear extrapolation.

18. The method of claim 16 wherein the step g) is a calculation.

* * * * *